(12) United States Patent
Mishra et al.

(10) Patent No.: US 12,555,645 B2
(45) Date of Patent: Feb. 17, 2026

(54) SYSTEMS AND METHODS TO PERFORM AUTOMATIC TEST PATTERN GENERATION ON MULTIPLE MEMORY UNITS IN PARALLEL

(71) Applicant: TEXAS INSTRUMENTS INCORPORATED, Dallas, TX (US)

(72) Inventors: Nitesh Mishra, Chakeri (IN); Hrithik Sahni, New Delhi (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/524,526

(22) Filed: Nov. 30, 2023

(65) Prior Publication Data
US 2025/0118389 A1    Apr. 10, 2025

(30) Foreign Application Priority Data
Oct. 9, 2023    (IN) .............................. 202341067466

(51) Int. Cl.
  *G11C 16/04*    (2006.01)
  *G11C 29/56*    (2006.01)

(52) U.S. Cl.
  CPC .. *G11C 29/56004* (2013.01); *G11C 29/56016* (2013.01); *G11C 2029/5602* (2013.01)

(58) Field of Classification Search
  CPC ........ G11C 29/56004; G11C 29/56016; G11C 2029/5602
  See application file for complete search history.

(56) References Cited

U.S. PATENT DOCUMENTS

| | | | |
|---|---|---|---|
| 7,734,975 B2 * | 6/2010 | Anzou | G01R 31/31721 714/733 |
| 8,151,149 B2 * | 4/2012 | Lee | G11C 29/46 365/201 |
| 8,427,893 B2 * | 4/2013 | Seo | G11C 29/02 365/201 |
| 9,230,693 B1 * | 1/2016 | Lee | G11C 29/78 |
| 2005/0207245 A1 | 9/2005 | Kang | |
| 2007/0070740 A1 | 3/2007 | Song | |
| 2008/0212383 A1 | 9/2008 | Ku et al. | |
| 2009/0219774 A1 | 9/2009 | Kim | |
| 2011/0310685 A1 | 12/2011 | Song | |
| 2021/0318378 A1 | 10/2021 | Pradeep et al. | |

OTHER PUBLICATIONS

International Patent Search Report for PCT/US2023/086334 dated Jun. 28, 2024; 3 pages.

* cited by examiner

*Primary Examiner* — Pho M Luu
(74) *Attorney, Agent, or Firm* — Michael T. Gabrik; Frank D. Cimino

(57) ABSTRACT

Systems and methods may perform sequential automatic test pattern generation (ATPG) on parallel memory units. A first array of logic gates may output enable signals to cause multiple memory units to be enabled in parallel. Test pattern generation and test control logic may perform forward path testing, backward path testing, and any other appropriate testing on the enabled memory units. The systems and methods may then move on to another group of memory units, which are enabled in parallel and tested in parallel.

20 Claims, 7 Drawing Sheets

SYSTEMS AND METHODS TO PERFORM AUTOMATIC TEST PATTERN GENERATION ON MULTIPLE MEMORY UNITS IN PARALLEL

CROSS-REFERENCE TO RELATED APPLICATIONS

The present application claims priority to Indian Patent Application 202341067466, filed Oct. 9, 2023, the disclosure of which is hereby incorporated by reference in its entirety.

TECHNICAL FIELD

The present disclosure relates generally to memory circuits, and more particularly to systems and methods allowing for parallel testing of multiple memory units.

BACKGROUND

The higher clock frequencies and smaller geometry sizes in today's integrated circuits have led to an increase in speed related defects which are commonly referred as transition delay faults. Thus, it is desirable that the devices are screened for such faults using at-speed testing. Effective scan-based at-speed test techniques are available in leading automated test pattern generator (ATPG) tools. The most common at-speed tests to check for manufacturing defects and process variations include test patterns created for transition and path-delay fault models. With increase in the memory content in respective designs to be tested, more and more critical testing paths are related to memory interface paths. Memory interface paths currently are tested using two different methods—ATPG testing and built-in self testing (BIST). In both cases, the actual true data path starting at functional logic and passing through the functional interface of the memory may not be tested.

Random access memory (RAM) sequential ATPG is an ATPG method to cover the memory functional interface path. It tests memories through the actual timing critical paths by generating effective memory interface structural tests. Various challenges exist in testing timing critical paths in memory circuits. One of these challenges includes complex memory architectures such as memory implementations which contain memory self-loops and/or other testing paths within a larger memory structure to be tested. Even without complex memory architectures, the presence of multiple physical memories within a logical memory may lead to a relatively large number of control points, resulting in a large number of paths to be tested.

SUMMARY

In one example, a method includes entering a test mode for a memory device having a plurality of parallel memory units, the plurality of parallel memory units including a first subset of memory units and a second subset of memory units; enabling a first memory unit of the first subset of memory units and a second memory unit of the second subset of memory units, wherein enabling the first memory unit and enabling the second memory unit overlaps in time; and performing a first test operation on the first memory unit and on the second memory unit, including writing test data to the first memory unit and to the second memory unit.

In another example, a circuit includes a memory device having a plurality of parallel memory units, the plurality of parallel memory units including a first subset of memory units and a second subset of memory units; a first logic block configured to: enable a first memory unit of the first subset of memory units and, in parallel, enable a second memory unit of the second subset of memory units; and disable further memory units of the first subset of memory units and further memory units of the second subset of memory units during a time in which the first memory unit and the second memory unit are enabled; and a second logic block configured to perform a first sequential automatic test pattern generation (ATPG) operation on the first memory unit and on the second memory unit in parallel, including writing test data to the first memory unit and to the second memory unit and reading the test data from the first memory unit and from the second memory unit.

In yet another example, a circuit includes a memory device having a plurality of parallel memory units, the plurality of parallel memory units including a first subset of memory units and a second subset of memory units; a first logic gate array having inputs coupled to first test enable logic and outputs coupled to enable inputs of the first subset of memory units; a second logic gate array having inputs coupled to second test enable logic and outputs coupled to enable inputs of the second subset of memory units; a third logic gate array having inputs coupled to third test enable logic and outputs of the first subset of memory units, wherein the third logic gate array has outputs coupled to a first set of flip-flops; a fourth logic gate array having inputs coupled to fourth test enable logic and outputs of the second subset of memory units, wherein the fourth logic gate array has outputs coupled to a second set of flip-flops; and a test generation logic block coupled to data inputs of the first subset of memory units and coupled to data inputs of the second subset of memory units.

BRIEF DESCRIPTION OF THE DRAWINGS

Figure 1:
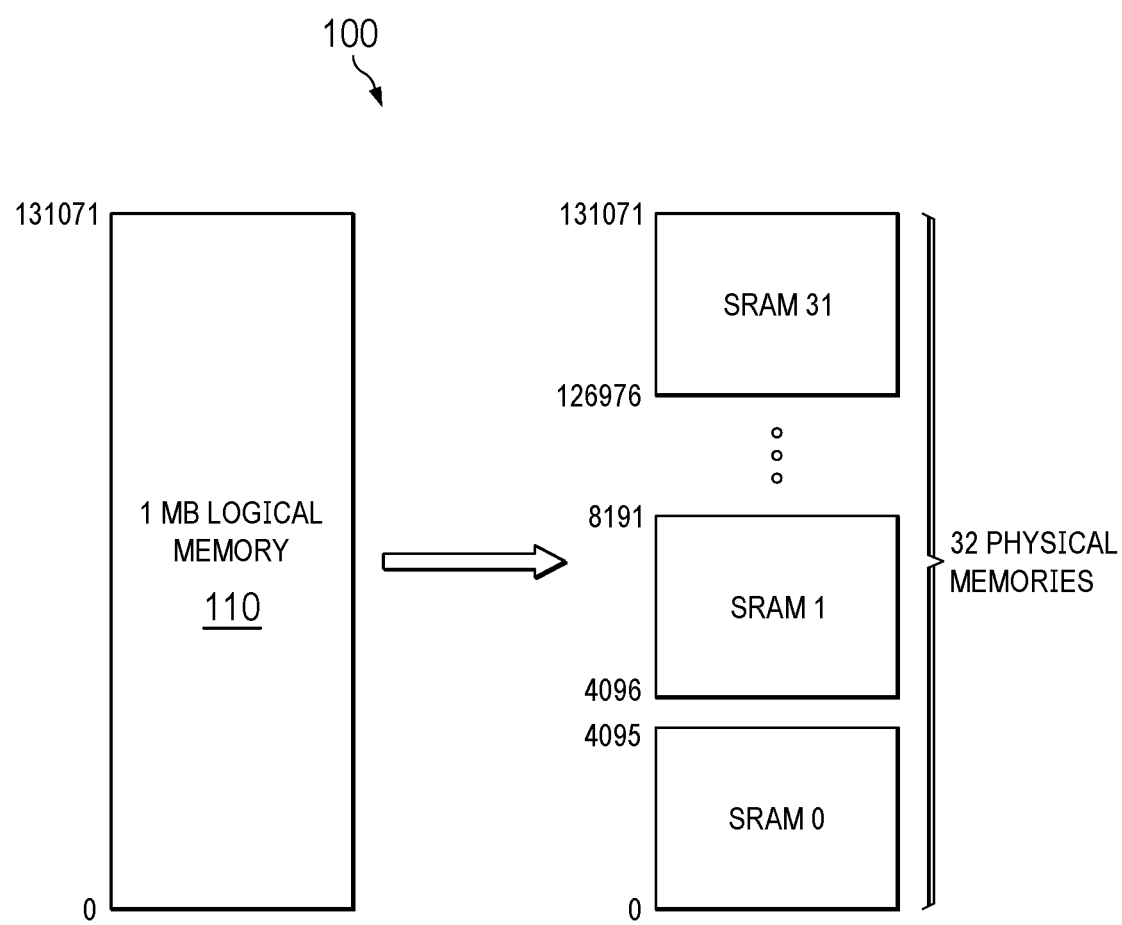

Having thus described the invention in general terms, reference will now be made to the accompanying drawings, wherein:

FIG. 1 is an illustration of an example memory architecture, including multiple memory units, according to some embodiments.

Figure 2:
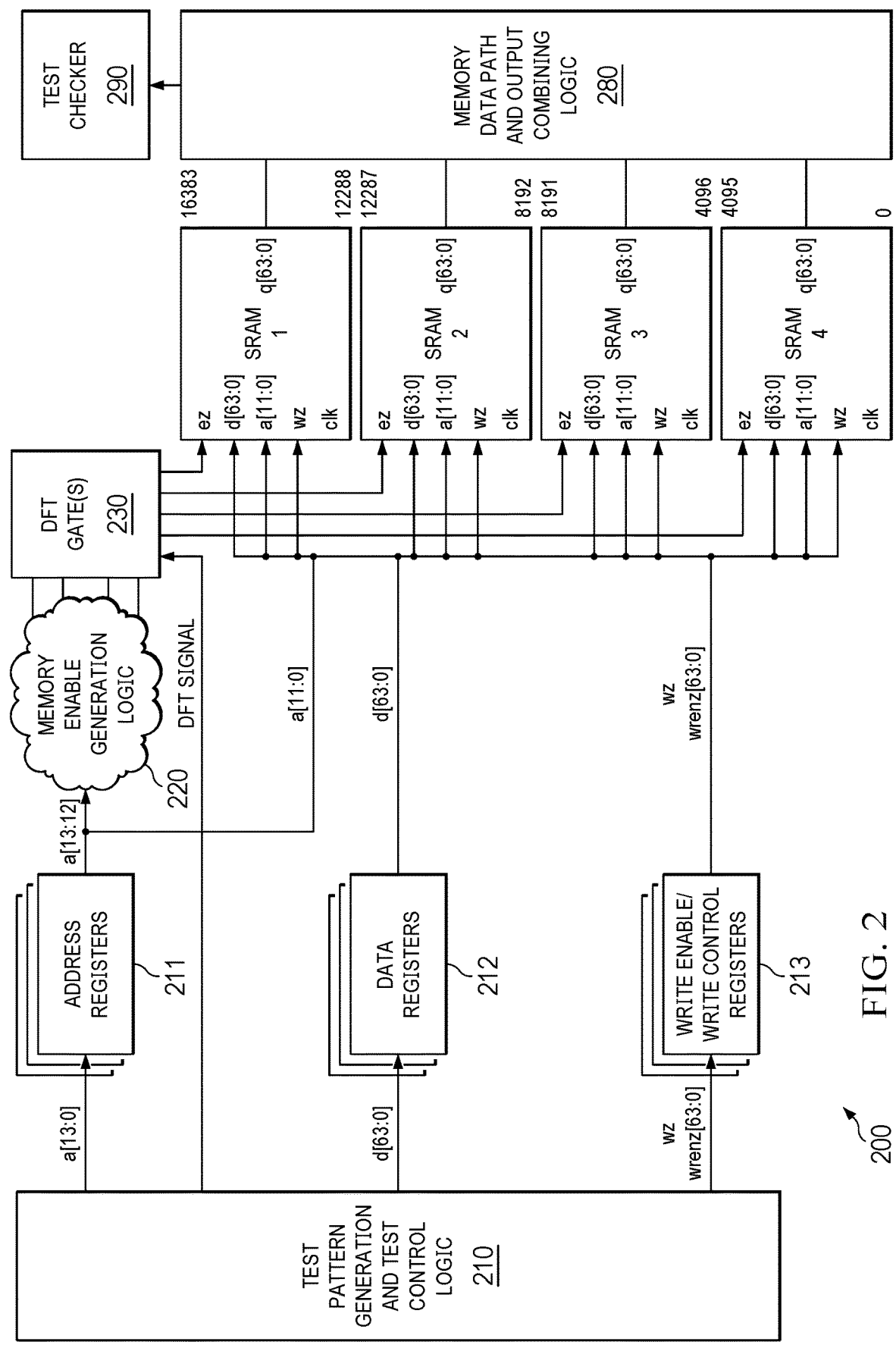

FIG. 2 is an illustration of an example memory testing architecture, according to some embodiments.

Figure 3:
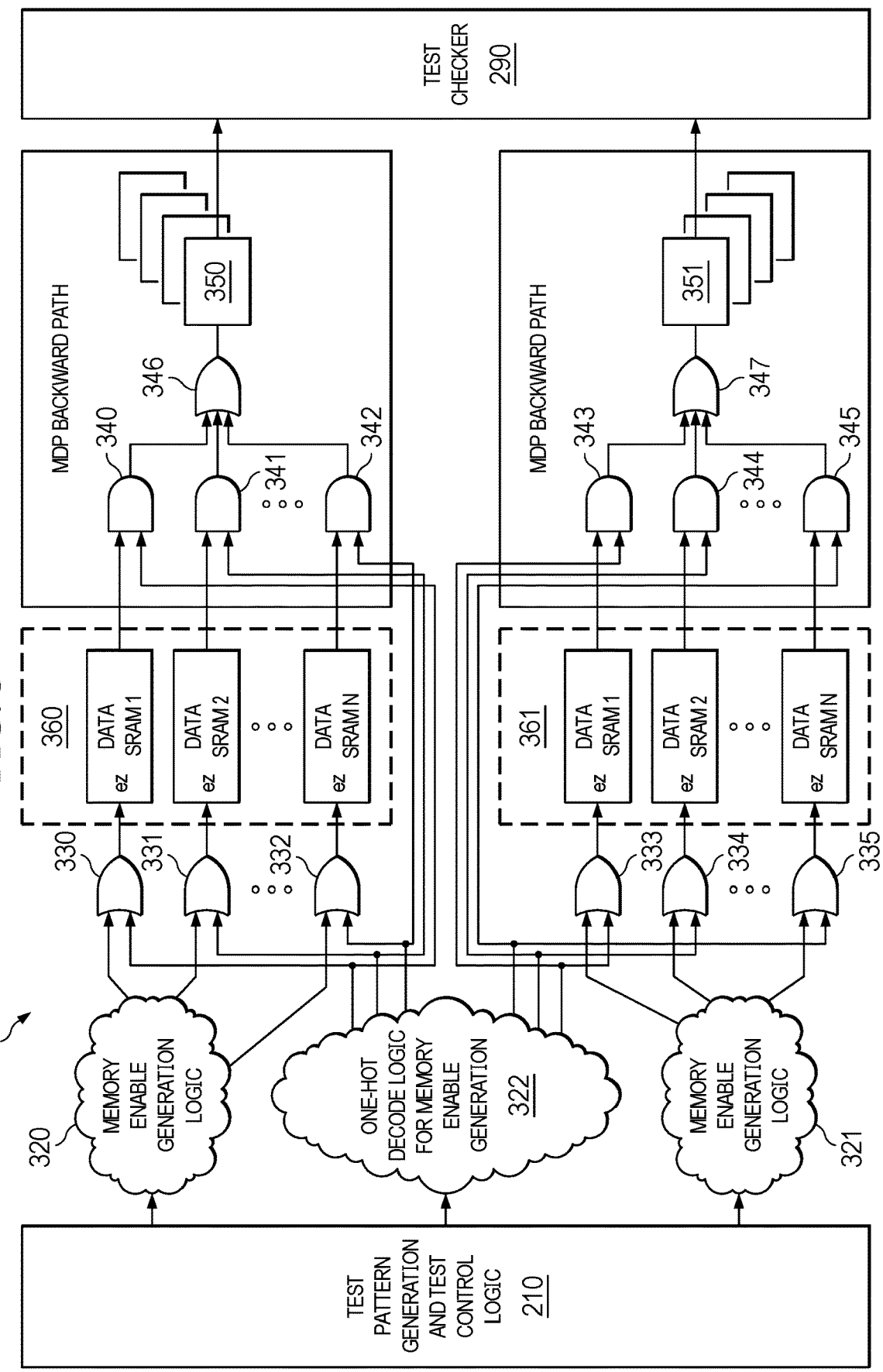

FIG. 3 is an illustration of an example memory testing architecture, according to some embodiments.

Figure 4:
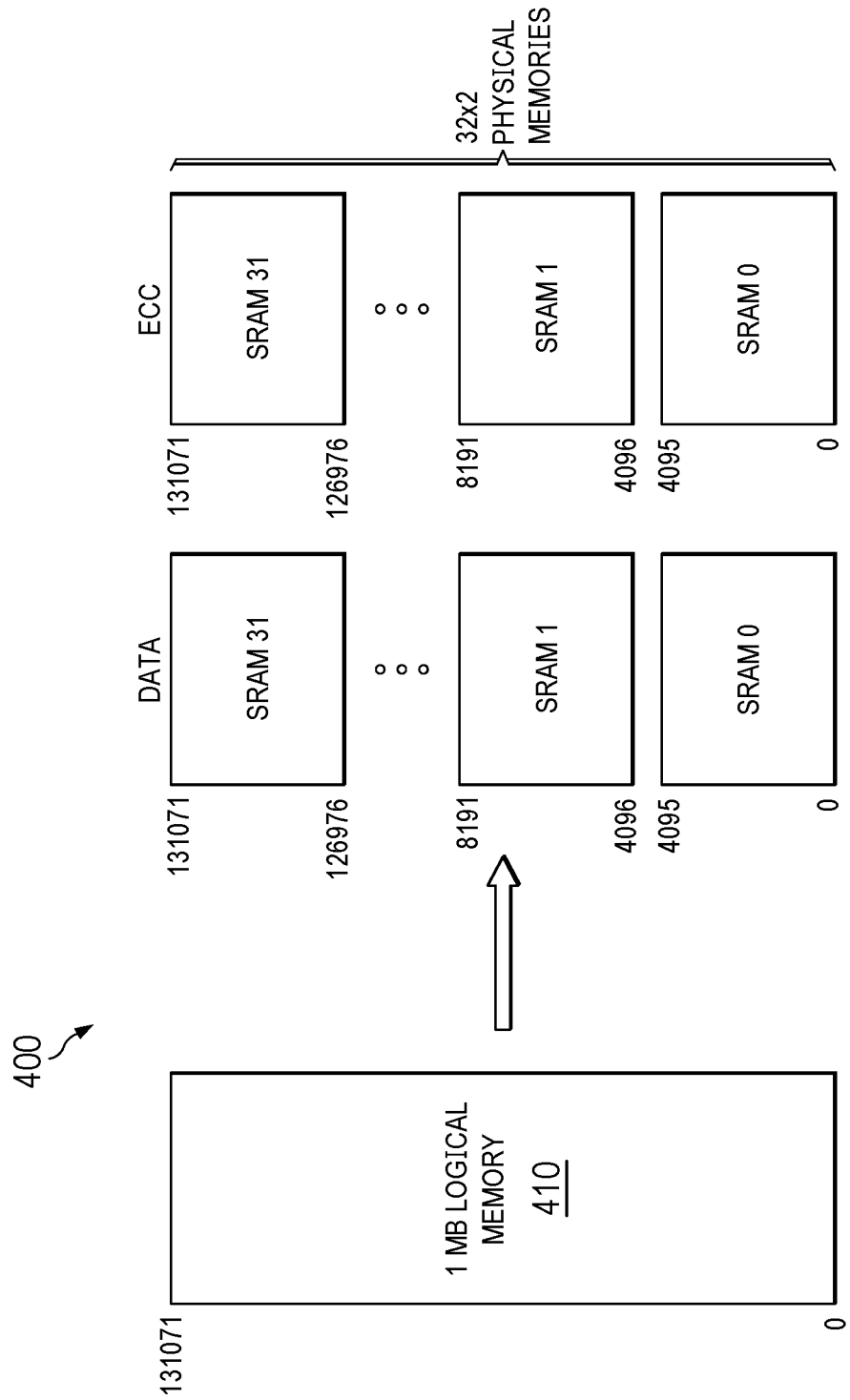

FIG. 4 is an illustration of an example memory architecture, including multiple memory units, some of which are data units and some of which are error correcting code (ECC) units, according to some embodiments.

Figure 5:
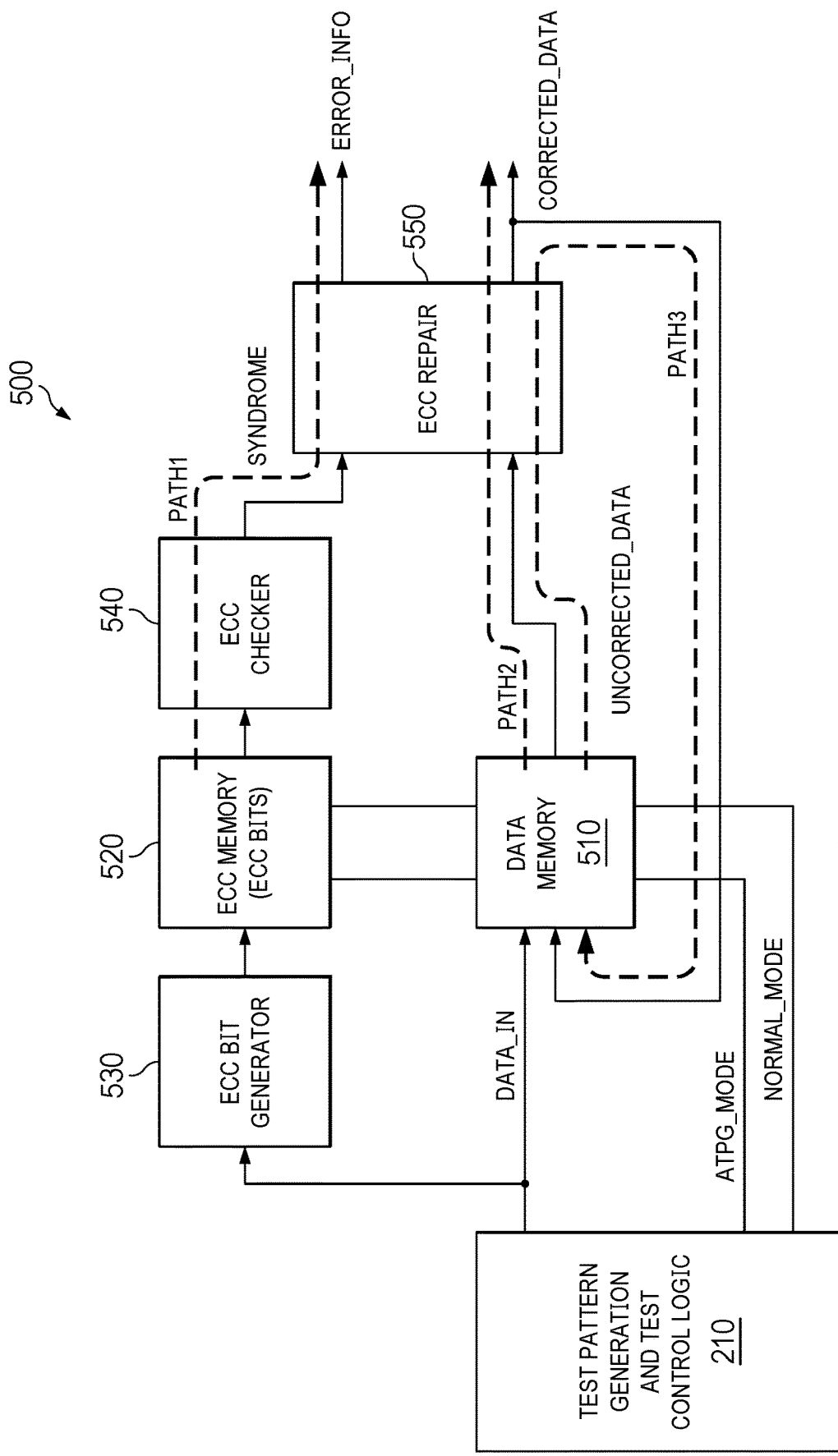

FIG. 5 is an illustration of example testing paths in the example memory architecture of FIG. 4, according to some embodiments.

Figure 6:
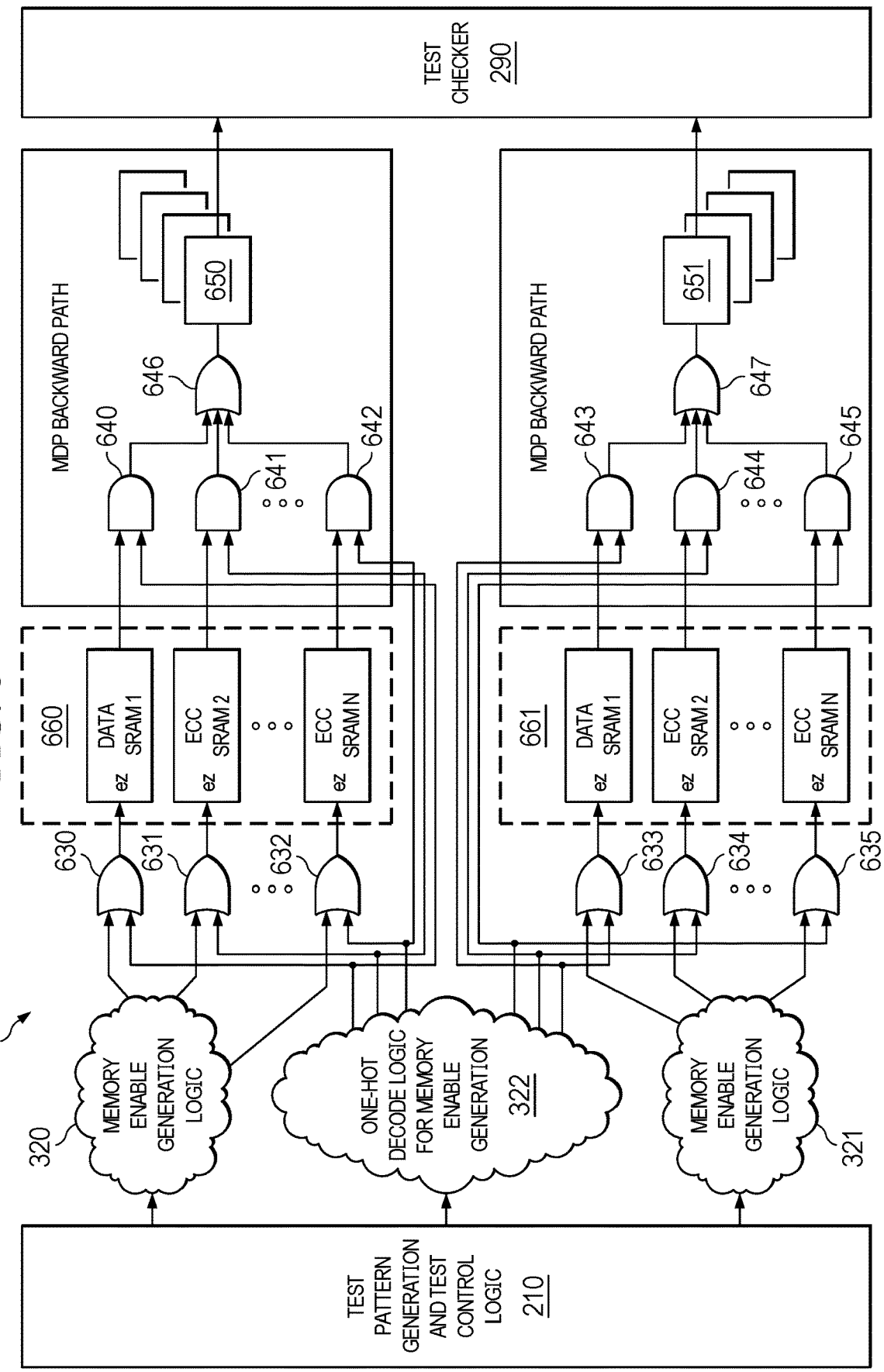

FIG. 6 is an illustration of an example memory testing architecture, configured to test data memory units and ECC memory units, according to some embodiments.

Figure 7:
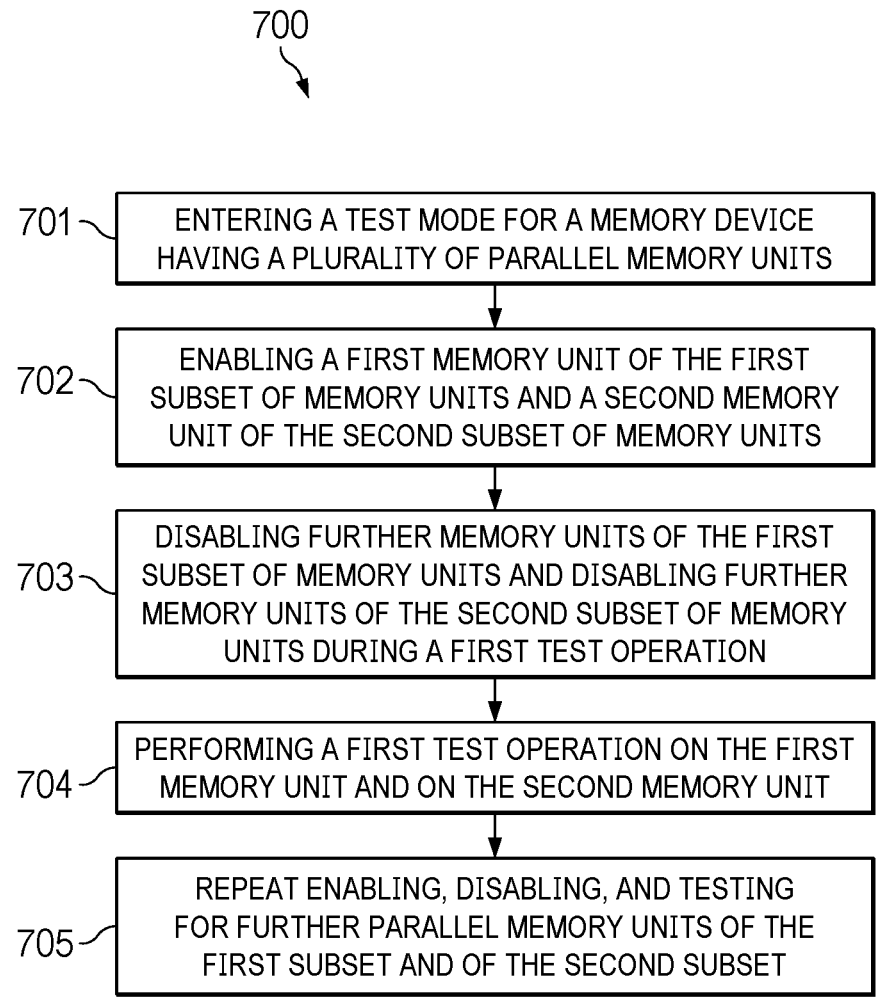

FIG. 7 is an illustration of an example memory testing method, according to some embodiments.

DETAILED DESCRIPTION

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

Corresponding numerals and symbols in the different figures generally refer to corresponding parts, unless otherwise indicated. The figures are not necessarily drawn to scale. In the drawings, like reference numerals refer to like elements throughout, and the various features are not necessarily drawn to scale. In the following discussion and in the claims, the terms "including," "includes," "having," "has," "with," or variants thereof are intended to be inclusive in a manner similar to the term "comprising," and thus should be interpreted to mean "including, but not limited to . . . ." Also, the terms "coupled," "couple," and/or or "couples" is/are intended to include indirect or direct electrical or mechanical connection or combinations thereof. For example, if a first device couples to or is electrically coupled with a second device that connection may be through a direct electrical connection, or through an indirect electrical connection via one or more intervening devices and/or connections. Elements that are electrically connected with intervening wires or other conductors are considered to be coupled. Terms such as "top," "bottom," "front," "back," "over," "above," "under," "below," and such, may be used in this disclosure. These terms should not be construed as limiting the position or orientation of a structure or element but should be used to provide spatial relationship between structures or elements.

On-chip memories may sometimes have a dominant footprint in a system on-chip (SOC) design. For instance, a significant percentage of timing critical paths may include memories, such as register to memory paths, memory to memory paths, and memory to register paths. In one example SOC with 650,000 flip-flops, memory contributes to almost 48% of total chip area.

Accordingly, it is desirable in some designs to have a high-quality memory interface test, such as an at-speed test of delay faults on the memory boundary, to achieve high test quality and lower defective parts per million (DPPM). Some solutions have provided relatively high-quality memory interface tests. One example includes automatic test pattern generation (ATPG), and another example includes memory built-in self test (MBIST). During ATPG and MBIST test procedures, the actual path starting from a functional flip-flop and going through a functional interface of the memory is not tested.

RAM sequential ATPG was introduced to fill this gap by testing memories through the timing critical paths by generating effective memory interface structural tests. However, in RAM sequential ATPG, the testing tool generally should control the flip-flops related to the launch paths and also the flip-flops that capture the data from memory. For this reason, it can be difficult to achieve high coverage through RAM sequential ATPG given the amount of complexity involved in generating the required controls and sequential patterns to control those various flip-flops. Put another way, when performing a test that controls the flip-flops related to the launch paths, the memory bit cells themselves, and the flip-flops that capture the data from the memory bit cells, the total number of control points may be so large as to be impractical, at least for some designs.

Furthermore, various memory circuit designs combine a multitude of physical memory units into a larger logical memory. For instance, one SOC design may include four, 16, or 32 (or other) number of physical memory units in a logical memory. An example of a physical memory unit may include a static random access memory (SRAM) unit, a ROM unit, or other appropriate memory unit. The memory may use address, data, and control signals that are broadcasted to the physical memory units from the CPU core. Continuing with this example, the memory enable may be one hot decoded based on the address most significant bits so that only one of the memories is active at any given time. In RAM sequential ATPG, because of the constraint of only one memory being accessible at a given time, the test time may be multiplied by the number of physical memory units.

As noted above, RAM sequential ATPG may launch test data from a functional unit, cause that data to be captured through functional interfaces of a memory and inside bit cells of the memory, and cause that data to be read out of the memory through other functional interfaces. This is in contrast to other techniques, such as BIST, that bypass functional interfaces and memory bit cells. However, functional interfaces and memory bit cells may create a large number of permutations to be tested, which may lead to relatively lengthy test times. Furthermore, the relatively lengthy test times may be multiplied by the division of the logical memory into separate physical memories, where each of those separate physical memories are individually tested.

Various embodiments may allow for multiple physical memory units to be tested at the same time. For instance, some embodiments enable multiple memories to write the same pattern at the same time, which is expected to reduce test time and also reduce test volume when generating input fault patterns. Various embodiments may exploit the parallelism of physical memory units in a logical memory, e.g., such as when memory may be divided into a multitude of parallel subsets. Continuing with the example, such systems may test a memory unit within each subset at a given time, so if there are four subsets, four memory units may be tested at a given time. The testing technique may cycle through the individual memory units of each of the subsets.

Such embodiments may provide one or more advantages over other solutions. For instance, given that at least some RAM sequential ATPG techniques may employ complex address and control signals to control the flip-flops at the launch path and the flip-flops that capture the data from the memory, such techniques may be costly in terms of time. However, embodiments described herein that exploit the parallelism of the physical memory units may reduce an amount of time for testing.

FIG. 1 is an illustration of an example memory architecture 100, which may be adapted for use in various embodiments. In this example, the 1 MB logical memory 110 is made up of 32 physical memory units, denoted as SRAM 0-SRAM 31. The logical memory 110 represents the total addressable memory space, while the 32 physical memory units denote the individual components that make up the physical RAM (Random Access Memory).

Each of the 32 physical memory units is designed to handle a portion of the logical memory space. To accomplish this, the 1 MB logical memory is divided into 32 equal segments, with each segment being 1 MB/32=32 KB in size. In the present example, the logical memory 110 includes 131,072 addressable rows, which are divided among the physical memory units SRAM 0-SRAM 31. For instance, SRAM 0 has addressable rows 0-4095, whereas SRAM 1 has addressable rows 4096-8191, and on and on.

Of course, the size 1 MB, and the number of physical memory units (32) are for example only. Rather, the size and physical divisions of FIG. 1 illustrate that logical memories may be physically implemented using any appropriate number of physical memory units. Memory architecture 100 may be adapted for use in any appropriate application, such as in a memory chip with a memory management unit (MMU), a microcontroller, a system-on-a-chip (SOC), and the like.

Various embodiments provide systems and methods to test separate physical memories in parallel, thereby reducing testing time. FIG. 2 is an illustration of an example memory testing architecture 200, which may be adapted for use in various embodiments that have multiple parallel memory units, such as in the example of FIG. 1.

Architecture 200 includes individual memory units SRAM 1-SRAM 4. The individual memory units SRAM 1-SRAM 4 may be written to and read from during normal operation. For instance, each of the individual memory units has an input ez, which is an enable input to cause a given individual memory unit to be functional. During normal operation, only one of the individual memory units would be enabled at a given time. In this example, a given individual memory unit may operate by receiving 64-bit wide data inputs (d[63:0]) from data registers 212, which contain the information to be written into or read from the memory unit. Additionally, the individual memory unit may receive address signals (a[11:0]) from address registers 211, which specify the location within the memory unit where data operations should occur. The memory unit also features inputs (wz) for controlling write operations, including write enable and write control signals sourced from registers 213. These write enable and write control signals determine whether data is written into the specified memory location. Subsequently, the memory unit may process the data inputs and control signals and may write, read, or modify data stored at an addressed location. The memory unit may also provide data output (q[63:0]) which carries the result of read operations.

Furthermore, during normal operation, the design for test (DFT) signal may be disabled (e.g., at a binary zero value), and the memory enable generation logic 220 may activate a given one of the individual memory units SRAM 1-SRAM 4 through its respective enable input ez. Enabling a given memory unit may allow data to be read to or written from the given memory unit. The address registers 211, the data registers to 12, and the write enable and write control registers 213 may be populated by a processing unit, such as a central processing unit (CPU), a microprocessor control unit (MCU), or the like.

By contrast, during test mode, the test pattern generation and test control logic 210 may populate the registers 211-213 and enable the DFT signal (e.g., change to a binary one value). An example of DFT gates 230 may include an array of logic gates, where the array of logic gates may enable all individual memory units SRAM 1-SRAM 4 when the DFT signal is high and may enable only one memory unit at a time when the DFT signal is low.

Continuing with an example test mode, test pattern generation and test control logic 210 may be pre-programmed with test data for registers 212 as well as control data for registers 211 and 213. For instance, a given test operation may include writing one or more test patterns into memory bit cells at a particular address within a given individual memory unit. For instance, some memory units may allow for a row to be read from or written to at a given time. Thus, in some examples, the test pattern generation and test control logic 210 may enable all four individual memory units SRAM 1-SRAM 4 at the same time, write test data to a given row or set of rows in each respective memory unit SRAM 1-SRAM 4, and then read test data from those given rows or set of rows in each respective memory unit SRAM 1-SRAM 4.

In one example test mode, a forward path is tested by writing test data at-speed to memory bit cells and then reading the test data from those memory bit cells at a slower rate. A backward path may be tested by writing test data at a slower rate to the memory bit cells and then reading the test data from those memory bit cells at-speed. Furthermore, the test mode may also include disabling the DFT signal and testing the individual paths between the DFT gates 230 and the respective memory units by writing data through those paths at-speed and reading data out of the bit cells at a slower rate (a "top off"). The at-speed and slower rate may be set appropriately for a given application, and in some examples, the slower rate may be 0.5 or less than the at-speed as measured in Hz.

The memory data path and output combining logic 280 may allow each of the individual memory units SRAM 1-SRAM 4 to be read out in parallel or read out one at a time. For instance, in a scenario in which the memory units SRAM 1-SRAM 4 may be tested in parallel and, thus, read out at the same time, memory data path and output combining logic 280 may include a set of flip-flops for each one of the individual memory units SRAM 1-SRAM 4. However, some operations (e.g., normal operation) may include only one memory unit being read at a given time, in which case the outputs may be combined into a single set of registers.

Test checker 290 may perform further actions of a test operation, such as determining whether values were written to or read from a set of memory bit cells correctly. Any appropriate test check algorithm may be used, such as comparing read-out test data to known test patterns, comparing hashes to hashes, or the like. The scope of implementations is not limited to any particular test check algorithm.

FIG. 3 is an illustration of an example memory testing architecture 300, according to various embodiments. Architecture 300 has M total memory units, with N memory units in each of two parallel groups. In other words, M=2*N. Of course, the scope of implementations is not limited to M=2*N, as architecture 300 may be scaled to include any multiple of N, and N can be any appropriate positive integer. A group of N memory units may be referred to as a parallel group or a domain controller group. Further, the M memory units may be included in a logical memory, such as in the example of FIG. 1.

An array of OR gates (OR gates 330-332) is coupled to the enable (ez) inputs of a first parallel group of memory units 360. Another array of OR gates (OR gates 333-335) is coupled to the enable inputs of a second parallel group of memory units 361. Although not explicitly shown for ease of illustration, each parallel group 360, 361 corresponds to N OR gates, one OR gate per memory unit. For the first parallel group 360, during a testing operation, test pattern generation and test control logic 210 works with memory enable generation logic 320 and one hot decode logic 322 to enable one of the memory units at a time of the parallel group 360. Similarly, during the same testing operation, test pattern generation test logic 210 works with memory enable generation logic 321 and one hot decode logic 322 to enable one of the memory units at a time of the parallel group 361.

Although memory enable generation logic 320, 321 are shown as being separate, some embodiments may implement a single set of functional flip-flops to provide the functionality of memory enable generation logic 320, 321. Furthermore, it is noted that memory enable generation logic 320, 321 may be used during normal operating mode to select an appropriate memory unit, while the present example discusses test mode operation. Furthermore, one hot decode logic 322 may be included within test pattern generation and test control logic 210 or may be physically separate from test pattern generation and test control logic 210.

As an example, during a particular test operation, one hot decode logic 322 may output a word [1, 0 . . . 0] and memory enable generation logic 320, 321 may output [1, 0 . . . 0] to cause data SRAM 1 of parallel group 360 and data SRAM 1 of parallel group 361 to be enabled at the same time. During that test operation, the other memory units, data SRAM 2 . . . data SRAM N of parallel groups 360, 361, are disabled, as their enable inputs receive a binary zero.

The addressing, write control and write enable, and data are not shown in FIG. 3 for ease of illustration. However, it is understood that the data SRAM units of FIG. 3 may be structured to have the same or similar inputs and outputs as those shown on the SRAM units of FIG. 2. Furthermore, it is understood that during a test operation, test pattern generation and test control logic 210 may generate signals for addressing, write control and write enable, and data to accomplish a given test according to RAM sequential ATPG principles. For instance, during a testing operation, where data SRAM 1 of parallel group 360 and data SRAM 1 of parallel group 361 are enabled, the test pattern generation and test control logic 210 may write data to SRAM 1 and SRAM 1 and/or may read data from SRAM 1 and SRAM 1.

Continuing with the example, an array of AND gates (AND gates 340-342) is coupled to the data outputs of the parallel group 360, and another array of AND gates (AND gates 343-345) is coupled to the data outputs of the parallel group 361. Although not shown explicitly, each one of the parallel groups 360, 361 corresponds to N AND gates, one AND gate per memory unit. During reading in a test operation, in which data SRAM 1 of parallel group 360 is enabled, AND gate 340 receives a digital 1, and the other gates 341-342 each receive a digital 0 from one hot decode logic 322. Therefore, only gate 340 passes data to OR gate 346 and to data output flip-flops 350. Similarly, during reading in the test operation, in which SRAM 1 of parallel group 361 is enabled, AND gate 343 receives a digital 1, and the other gates 344-345 each receive a digital zero from one hot decode logic 322. Therefore, only gate 343 passes data to OR gate 347 and further to data output flip-flops 351. Test checker 290 may then perform a test check algorithm on the data in respective data output flip-flops 350, 351.

Subsequently, test pattern generation and test control logic 210 may test other address ranges in data SRAM 1 and data SRAM 1 of parallel groups 360, 361. In one example, once data SRAM 1 and data SRAM 1 of parallel groups 360, 361 have had an appropriate number of address ranges tested, then test pattern generation and test control logic 210 may move to a next set of parallel memory units, such as data SRAM 2 and data SRAM 2 of parallel groups 360, 361. To enable data SRAM 2 and data SRAM 2 of parallel groups 360, 361, one hot decode logic 322 may output a word [0, 1 . . . 0] and memory enable generation logic 320, 321 may output [0, 1 . . . 0]. Once again, test pattern generation and test control logic 202 may iterate through address ranges and then move to the next set of parallel memory units, data SRAM 3 and data SRAM 3 and on and on until testing has been performed on data SRAM N and data SRAM N of parallel groups 360, 361.

A particular feature of architecture 300 is that memory data paths for each of the parallel groups include an array of AND gates and an OR gate (e.g., gates 340-342 and 346) to combine the outputs of the memory units of a given parallel group into a single set of flip-flops (e.g., flip-flops 350). Thus, N parallel memory units correspond to a single set of flip-flops, rather than corresponding to one set of flip-flop per each parallel memory unit. As a result, the architecture 300 saves semiconductor area by using a smaller number of flip-flops for testing.

Continuing with architecture 300, in the forward path, out of N memories in a parallel group, only one memory is active during a pattern by virtue of a one-hot decoded DFT signal ORed with functional memory enable signal. The same memory output path to the memory data path is active as the same one-hot signal is used in the backward path as well, making the complete path transparent. If desired, a top off test can be done by disabling the one hot decode logic 322.

Therefore, architecture 300 tests M/N memories in parallel for a given pattern, as opposed to testing only one memory total per pattern as in other solutions. A potential advantage is that time for test may be reduced, thereby increasing efficiency. Further, a designer may specify N based on power grid structure so that multiple parallel memory units may be tested at a given time, but not so many that the power grid structure is overwhelmed.

FIG. 4 is an illustration of an example memory architecture 400, adapted according to various embodiments. FIG. 1 is similar to FIG. 4, though FIG. 4 offers error correction code (ECC) functionality. Specifically, in architecture 400, each of the data SRAM units, SRAM 0-SRAM 31, corresponds to a respective ECC SRAM unit, SRAM zero-SRAM 31. Therefore, logical memory unit 410 includes 32×2 physical memory units. In one example, during a write operation, ECC for the data may be computed and stored in a corresponding ECC memory. During a read operation, ECC may again be computed and compared against the stored ECC data.

FIG. 5 illustrates an example of a memory 500 having multiple testing paths that can be tested according to configurable sequential testing sequences applied to individual memory units. The example memory 500 includes a data path and an error checking and correction path and is but one example of an ECC architecture that may be adapted for use in various embodiments. In this example, a data memory 510 and an error checking and correction (ECC) memory 520 collaborate to provide an ECC memory architecture. Data input shown as DATA_IN drives the data memory 510 and an ECC bit generator 530 that in turn provides ECC bits to the ECC memory 520. Output from the ECC memory 520 feeds an ECC checker 540 which provides input to an ECC repair circuit 550 which also receives data output from the data memory 510. The ECC repair circuit 550 may generate corrected data to the ECC memory 510 and provide the corrected data and/or error information to other circuits (e.g., memory supervisor in a processor circuit). An ATPG_MODE signal (one hot signal from one hot decode logic 622 of FIG. 6) and NORMAL_MODE signal can selectively control each of the data memory 510 and the ECC memory 520 during normal or testing mode sequences for the multipath memory.

Various testing paths are possible within the memory 500. A first path—PATH 1 for testing is shown through the respective ECC circuits 530, 520, 540, and 550. A second path—PATH 2 is shown from the data memory 510 through the ECC repair circuit 550. A third testing path—PATH 3 exists between the ECC repair 550 and is fed back to the data memory 510. The test pattern generation and test control logic 210 may allow for individual and isolated timing control of separate portions of the memory such as the ECC memory 520 on PATH 1 and data memory 510 on PATH 2 to exploit the parallel arrangement of memories in an ECC memory architecture, as described in more detail with respect to FIG. 6.

FIG. 6 is an illustration of an example memory testing architecture 600, according to various embodiments, for testing and ECC memory, such as the memory architecture 400 of FIG. 4.

The example of FIG. 6 includes as many SRAM units as the example of FIG. 3, a total of M*N, where M equals 2. However, in this example, each data SRAM unit corresponds to an ECC SRAM unit. For instance, looking at the parallel group 660, it includes data SRAM 1, an ECC SRAM 2, a data SRAM 3 (not pictured) and on and on until ECC SRAM N. Put another way, the data SRAM units are interleaved with the ECC SRAM units. The parallel group 661 is laid out in the same way. Also, the memory units of FIG. 6 may be included within an ECC-enabled logical memory, such as in the example of FIG. 4.

There are other similarities between architecture 300 of FIG. 3 and architecture 600 of FIG. 6. For instance, the array of OR gates, including OR gates 630-632, are arranged similarly to the array of OR gates that includes OR gates 330-332. The same is true for the array of OR gates, including OR gates 633-635, being similar to the array of OR gates that includes OR gates 333-335. Thus, each one of the SRAM units of parallel group 660 has an enable input that is coupled to an output of a respective one of the OR gates 630-632. Each one of the SRAM units of parallel group 661 has an enable input that is coupled to an output of a respective one of the OR gates 633-635. Each one of the OR gates 630-635 receives as an input a signal from the one hot decode logic 322 and a signal from respective memory enable generation logic 320, 321.

A data output of each one of the SRAM units of parallel group 660 is coupled to an input of a corresponding AND gate 640-642. Likewise, data output of each one of the SRAM units of parallel group 661 is coupled to an input of a corresponding AND gate 643-645. Each of the AND gates 640-643 also receives as an input a signal from the one hot decode logic 322. AND gates 640-642 output to OR gate 646 and further to flip-flops 650. AND gates 643-645 output to OR gate 647 and further to flip-flops 651. Test checker 290 may receive the output test data from flip-flops 650 and 651 and perform any appropriate test checking algorithm.

One aspect of architecture 600 is that the SRAM units, both ECC SRAM units and data SRAM units, are laid out in parallel, at least with respect to an array of OR gates and an array of AND gates, just as in architecture 300 of FIG. 3. Thus, during a particular test operation, one hot decode logic 322 may output a word [1, 0 . . . 0] and memory enable generation logic 320, 321 may output [1, 0 . . . 0] to cause data SRAM 1 of parallel group 660 and data SRAM 1 of parallel group 661 to be enabled at the same time. Similarly, AND gates 640, 643 receive digital 1, and the other AND gates 641, 642, 644, 645 receive digital 0. Therefore, data SRAM 1 of parallel group 660 and data SRAM 1 of parallel group 661 may be written to and read from during a test operation. During that test operation, the other memory units data ECC SRAM 2 . . . ECC SRAM N of parallel groups 660, 661 are disabled, as their enable inputs receive a binary zero. Additional test operations may test further address ranges of data SRAM 1 of parallel group 660 and data SRAM 1 of parallel group 661.

In a subsequent test operation, one hot decode logic 322 may output a word [0, 1 . . . 0] and memory enable generation logic 320, 321 may output [0, 1 . . . 0] to cause ECC SRAM 2 of parallel group 660 and ECC SRAM 2 of parallel group 661 to be enabled at the same time. Similarly, AND gates 641, 644 receive digital 1, and the other AND gates receive digital 0. Therefore, ECC SRAM 2 of parallel group 660 and ECC SRAM 2 of parallel group 661 may be written to and read from during a test operation. During that test operation, the other memory units data SRAM 1, data SRAM 3 . . . ECC SRAM N of parallel groups 660, 661 are disabled, as their enable inputs receive a binary zero.

Further subsequent test operations may enable and test data SRAM 3 of parallel groups 660, 661, then ECC SRAM 4, and on and on through ECC SRAM N. Looking back to FIG. 5, when architecture 600 tests one of the data SRAM units, it tests a PATH 2, and when it tests an ECC SRAM unit, it tests a PATH 1.

Of course, the scope of implementations is not limited to testing RAM memory units, as some implementations may test ROM memory units. For instance, testing a ROM unit may include performing a read operation but not a write operation. Thus, a ROM testing architecture may be similar to those shown in FIGS. 3 and 6, with an array of gates (e.g., OR gates) to enable a given ROM unit within a parallel group and with an array of gates (e.g., AND gates) to receive output data from the respective, enabled given ROM unit. The testing may use subsequent test operations to enable and test multiple ROM units, one ROM unit per parallel group, at a given time.

FIG. 7 is an illustration of an example method 700, for performing parallel testing, according to various embodiments. Example method 700 may be performed by the architectures 300 of FIG. 3 and 600 of FIG. 6.

At action 701, the memory device enters a test mode. The memory device may include a plurality of parallel memory units, where the plurality of parallel memory units are arranged into subsets of memory units. An example of subsets of memory units includes parallel groups 360, 361 of FIG. 3 and 660, 661 of FIG. 6. Each one of the subsets of memory units (e.g., parallel group 360) may include a plurality of memory units (e.g., SRAM 1 . . . SRAM 2). The memory units may be RAM or ROM, and may be for data or ECC bits, depending on the memory device.

The test mode may be different from a normal operating mode. In one example, the test mode uses test data and testing control signals and uses testing algorithms on the output. Furthermore, the test mode may include controlling the memory enable generation logic (e.g., logic 320, 321) and one hot decode logic (e.g., logic 322) to perform the actions of 702-705. The test mode may be triggered by a control signal (not shown) from a CPU or other appropriate processing device.

Action 702 includes enabling a first memory unit of a first subset of memory units and enabling a second memory unit of a second subset of memory units. For example, looking at FIG. 3, action 702 may include enabling data SRAM 1 of parallel group 360 and enabling data SRAM 1 of parallel group 361. Action 702 may include asserting an enable signal at enable inputs of the first memory unit and the second memory unit. In the examples of FIGS. 3 and 6, the enable signals are generated under control of one hot decode logic 322, memory enable generation logic 320, 321 and test pattern generation and test control logic 210.

Action 702 may further include controlling an array of logic gates at the outputs of the first subset of memory units and second subset of memory units. For instance, in the examples of FIGS. 3 and 6, there is an array of AND gates at the outputs of the parallel groups 360, 361 and 660, 661. The array of AND gates are configured to receive test data that is shifted out of respective ones of the memory units.

Action 703 may include disabling further memory units of the first subset of memory units and disabling further memory units of the second subset of memory units during a test operation. For instance, in the example of FIG. 3, when data SRAM 1 of parallel group 360 is enabled, the data SRAM 2 . . . data SRAM N are disabled, and the same is true for parallel group 361.

Action 704 may include performing a first test operation on the first memory unit and on the second memory unit. In this example, the first and second memory units may be tested simultaneously or, if not precisely simultaneously, at least within overlapping time periods. Testing may include any appropriate technique, such as forward path testing, backward path testing, and top off testing. Furthermore, action 704 may include shifting out test data from the memory units under test to a respective set of flip-flops and further to test logic, which may perform any appropriate testing algorithm. Additionally, action 704 may further include performing testing on further address ranges of each of the memory units under test. For instance, once both of the SRAM 1 units have had a first range of addresses tested, testing may go to a subsequent range of addresses within both of the SRAM 1 units, repeating until each of the SRAM 1 units has been tested substantially in full.

Action 705 may include repeating the enabling, disabling, and testing of action 702-704 for further parallel memory units of the first subset and of the second subset. Looking at the example of FIG. 3, action 705 may include testing data SRAM 2 of each of the parallel units 360, 361 while disabling the other parallel memory units. Looking at the example of FIG. 6, action 705 may include testing ECC SRAM 2 of each of the parallel units 660, 661 while disabling the other parallel memory units. Action 705 may include the repeating until all, or an appropriate number, of the parallel memory units in each of the parallel groups have been tested.

As noted above, an advantage of some embodiments is that they may test multiple memory units at the same time. For instance, where M=N*X, various embodiments may test X number of memory units at the same time. In the examples of FIGS. 3 and 6, X is 2, so two parallel memory units are tested at the same time. However, the scope of implementations may include embodiments in which X is any appropriate integer. Parallel testing of memory units may increase efficiency by reducing an amount of testing time by a factor of X.

While various examples of the present disclosure have been described above, it should be understood that they have been presented by way of example only and not limitation. Numerous changes to the disclosed examples can be made in accordance with the disclosure herein without departing from the spirit or scope of the disclosure. Modifications are possible in the described embodiments, and other embodiments are possible, within the scope of the claims. Thus, the breadth and scope of the present invention should not be limited by any of the examples described above. Rather, the scope of the disclosure should be defined in accordance with the following claims and their equivalents.

What is claimed is:

1. A method comprising:
    entering a test mode for a memory device having a plurality of parallel memory units, the plurality of parallel memory units including a first subset of memory units and a second subset of memory units;
    enabling a first memory unit of the first subset of memory units and a second memory unit of the second subset of memory units, wherein enabling the first memory unit and enabling the second memory unit overlaps in time;
    performing a first test operation on the first memory unit and on the second memory unit, including writing test data to the first memory unit and to the second memory unit; and
    disabling a remainder of the first subset of memory units and disabling a remainder of the second subset of memory units during the first test operation.

2. The method of claim 1, wherein the enabling and the disabling comprise:
    providing a set of one hot decode signals to a first logic gate array, wherein the first logic gate array is coupled to enable inputs of the first subset of memory units; and
    providing the set of one hot decode signals to a second logic gate array, wherein the second logic gate array is coupled to enable inputs of the second subset of memory units.

3. The method of claim 1, wherein the enabling and the disabling comprise:
    providing a set of one hot decode signals to a first OR gate array, wherein the first OR gate array is coupled to enable inputs of the first subset of memory units; and
    providing the set of one hot decode signals to a second OR gate array, wherein the second OR gate array is coupled to enable inputs of the second subset of memory units.

4. The method of claim 1, further comprising: reading the test data from the first memory unit and from the second memory unit, wherein reading the test data overlaps in time on the first memory unit and on the second memory unit.

5. The method of claim 4, wherein reading the test data from the first memory unit and from the second memory unit comprises:
    providing a set of one hot decode signals to a first logic gate array, wherein the first logic gate array is coupled to outputs of the first subset of memory units;
    providing the test data from the first memory unit to a first set of flip-flops, wherein the first set of flip-flops are coupled to outputs of the first logic gate array;
    providing the set of one hot decode signals to a second logic gate array, wherein the second logic gate array is coupled to outputs of the second subset of memory units; and
    providing the test data from the second memory unit to a second set of flip-flops, wherein the second set of flip-flops are coupled to outputs of the second logic gate array.

6. The method of claim 4, wherein reading the test data from the first memory unit and from the second memory unit comprises:
    providing a set of one hot decode signals to a first AND gate array, wherein the first AND gate array is coupled to outputs of the first subset of memory units;
    providing the test data from the first memory unit to a first set of flip-flops, wherein the first set of flip-flops are coupled to outputs of the first AND gate array;

providing the set of one hot decode signals to a second AND gate array, wherein the second AND gate array is coupled to outputs of the second subset of memory units; and providing the test data from the second memory unit to a second set of flip-flops, wherein the second set of flip-flops are coupled to outputs of the second AND gate array.

7. The method of claim 1, wherein writing the test data to the first memory unit and to the second memory unit is performed at-speed, the method further comprising:

providing the test data from the first memory unit and from the second memory unit at a clock frequency that is less than at-speed.

8. The method of claim 7, wherein the test data from the first memory unit and from the second memory unit is provided at a clock frequency that is less than half of an at-speed clock frequency.

9. The method of claim 1, wherein the first memory unit comprises a first data RAM unit, and wherein the second memory unit comprises a second data RAM unit, wherein the method further comprises:

in a second and subsequent test operation, disabling the first data RAM unit and the second data RAM unit, enabling a first error correction code (ECC) RAM unit and a second ECC RAM unit, and performing the second and subsequent test operation on the first ECC RAM unit and the second ECC RAM unit, wherein the first data RAM unit and the first ECC RAM unit are arranged in a first loop, and wherein the second data RAM unit and the second ECC RAM unit are arranged in a second loop.

10. A circuit comprising:

a memory device having a plurality of parallel memory units, the plurality of parallel memory units including a first subset of memory units and a second subset of memory units;

a first logic block configured to:
in an operating mode, enable a first memory unit of the first subset of memory units and, concurrently, disable a remainder of the first subset of memory units and an entirety of the second subset of memory units; and
in a test mode, enable the first memory unit of the first subset of memory units and, in parallel, enable a second memory unit of the second subset of memory units and, concurrently, disable the remainder of the first subset of memory units and a remainder of the second subset of memory units; and a second logic block configured to perform a first sequential automatic test pattern generation (ATPG) operation on the first memory unit and on the second memory unit in parallel, including writing test data to the first memory unit and to the second memory unit and reading the test data from the first memory unit and from the second memory unit.

11. The circuit of claim 10, wherein the first logic block comprises one hot decode logic, wherein the one hot decode logic is further configured to:

provide a set of one hot decode signals to a first logic gate array, wherein the first logic gate array is coupled to enable inputs of the first subset of memory units; and provide the set of one hot decode signals to a second logic gate array, wherein the second logic gate array is coupled to enable inputs of the second subset of memory units.

12. The circuit of claim 10, wherein the first logic block comprises one hot decode logic, wherein the one hot decode logic is further configured to:

provide a set of one hot decode signals to a first OR gate array, wherein the first OR gate array is coupled to enable inputs of the first subset of memory units; and provide the set of one hot decode signals to a second OR gate array, wherein the second OR gate array is coupled to enable inputs of the second subset of memory units.

13. The circuit of claim 10, wherein the second logic block is further configured to shift the test data out of the first memory unit and out of the second memory unit at a clock frequency that is less than at-speed.

14. The circuit of claim 10, wherein the first logic block is further configured to:

provide a set of one hot decode signals to a first logic gate array, wherein the first logic gate array is coupled to outputs of the first subset of memory units;

provide the test data from the first memory unit to a first set of flip-flops, wherein the first set of flip-flops are coupled to outputs of the first logic gate array;

provide the set of one hot decode signals to a second logic gate array, wherein the second logic gate array is coupled to outputs of the second subset of memory units; and provide the test data from the second memory unit to a second set of flip-flops, wherein the second set of flip-flops are coupled to outputs of the second logic gate array.

15. The circuit of claim 10, wherein the first logic block is further configured to:

provide a set of one hot decode signals to a first AND gate array, wherein the first AND gate array is coupled to outputs of the first subset of memory units;

provide the test data from the first memory unit to a first set of flip-flops, wherein the first set of flip-flops are coupled to outputs of the first AND gate array;

provide the set of one hot decode signals to a second AND gate array, wherein the second AND gate array is coupled to outputs of the second subset of memory units; and provide the test data from the second memory unit to a second set of flip-flops, wherein the second set of flip-flops are coupled to outputs of the second AND gate array.

16. The circuit of claim 10, wherein the first subset of memory units includes interleaved data memory units and error correction code (ECC) memory units, and wherein the second subset of memory units includes interleaved data memory units and ECC memory units.

17. A circuit comprising:

a memory device having a plurality of parallel memory units, the plurality of parallel memory units including a first subset of memory units and a second subset of memory units;

a first logic gate array having inputs coupled to first test enable logic and outputs coupled to enable inputs of the first subset of memory units;

a second logic gate array having inputs coupled to second test enable logic and outputs coupled to enable inputs of the second subset of memory units;

a third logic gate array having inputs coupled to third test enable logic and outputs of the first subset of memory units, wherein the third logic gate array has outputs coupled to a first set of flip-flops;

a fourth logic gate array having inputs coupled to fourth test enable logic and outputs of the second subset of memory units, wherein the fourth logic gate array has outputs coupled to a second set of flip-flops; and a test generation logic block coupled to data inputs of the first subset of memory units and coupled to data inputs of the second subset of memory units.

18. The circuit of claim 17, wherein the first subset of memory units includes interleaved data memory units and error correction code (ECC) memory units, and wherein the second subset of memory units includes interleaved data memory units and ECC memory units.

19. The circuit of claim 17, wherein the first logic gate array comprises a first OR gate array, and wherein the second logic gate array comprises a second OR gate array.

20. The circuit of claim 17, wherein the third logic gate array comprises a first AND gate array with outputs coupled to a first OR gate, and wherein the fourth logic gate array comprises a second AND gate array with outputs coupled to a second OR gate, wherein the first OR gate is coupled to a first set of flip-flops, and wherein the second OR gate is coupled to a second set of flip-flops.

* * * * *